United States Patent [19]

Pearson

[11] Patent Number: 5,721,964
[45] Date of Patent: Feb. 24, 1998

[54] ONE-TIME-USE CAMERA HAVING MAIN BODY PART AND INSERTABLE LIGHT BAFFLE WITH FILM HOLDERS TO FACILITATE CAMERA ASSEMBLY

[75] Inventor: Douglas H. Pearson, Rochester, N.Y.

[73] Assignee: Eastman Kodak Company, Rochester, N.Y.

[21] Appl. No.: 796,155

[22] Filed: Feb. 6, 1997

[51] Int. Cl.$^6$ .................................................. G03B 17/00
[52] U.S. Cl. .................................................. 396/6; 396/440
[58] Field of Search ................................... 396/440, 411, 396/415, 6

[56] References Cited

U.S. PATENT DOCUMENTS

| | | | |
|---|---|---|---|
| 5,438,380 | 8/1995 | Muramatsu | 354/105 |
| 5,530,507 | 6/1996 | Boyd | 354/212 |
| 5,555,063 | 9/1996 | Balling | 354/21 |

Primary Examiner—David M. Gray
Attorney, Agent, or Firm—Roger A. Fields

[57] ABSTRACT

A one-time-use camera comprising a main body part having a spaced pair of cartridge receiving and film roll chambers and a film exposing chamber located between the cartridge receiving and film roll chambers, a separate-part light baffle inserted into the film exposing chamber, a metering sprocket rotatably supported on the main body part for engaging an intermediate film section which bridges a film cartridge loaded into the cartridge receiving chamber and at least a partial film convolution placed in the film roll chamber, and a rear cover part fitted to the main body part to make the main body part light-tight, is characterized in that the light baffle has a film holder for preventing the intermediate film section which bridges the film cartridge loaded into the cartridge receiving chamber and at least the partial film convolution placed in the film roll chamber from separating from the metering sprocket before the rear cover part is fitted to the main body part.

15 Claims, 2 Drawing Sheets

ONE-TIME-USE CAMERA HAVING MAIN BODY PART AND INSERTABLE LIGHT BAFFLE WITH FILM HOLDERS TO FACILITATE CAMERA ASSEMBLY

CROSS-REFERENCE TO INCORPORATED PATENT

U.S. Pat. No. 5,530,507, issued Jun. 25, 1996 in the name of James D. Boyd and entitled METHOD OF ASSEMBLING ONE-TIME-USE CAMERA is incorporated in this application.

FIELD OF THE INVENTION

The invention relates generally to the field of photography, and in particular to one-time-use cameras. More specifically, the invention relates to a one-time-use camera having a main body part and an insertable light baffle with at least one film holder for facilitating camera assembly.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket, a manually rotatable film advance thumbwheel rotatably engaged with a film spool inside the film cartridge, a single-blade shutter, a manually depressible shutter release button, a frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

The intermediate leader section when engaged with the metering sprocket might separate (spring away) from the metering sprocket, before the rear cover part is connected to the main body part, because of the inherent curl of the unexposed filmstrip. If the rear cover part is connected to the main body part with the intermediate leader section separated from the metering sprocket, then, when the engageable end of the take-up spool is rotated to factory prewind substantially the entire length of the unexposed filmstrip from the film cartridge onto the take-up spool, the frame counter will not be incremented to be properly set.

Prior art U.S. Pat. No. 5,555,063, issued Sep. 10, 1996, and U.S. Pat. No. 5,530,507, issued Jun. 25, 1966, appear to disclose a method of assembling the main body part and a separate-part light baffle of the one-time-use camera, which includes the step of inserting the light baffle into a light receiving or film exposing chamber located between the cartridge receiving and film roll chambers. As shown in U.S. Pat. No. 5,555,063, an integral pair of parallel film rails of the main body part longitudinally extend from alongside the film exposing chamber to the film roll chamber in order to guide the unexposed filmstrip (beginning with the intermediate leader section) onto the film take-up spool when the film take-up spool is rotated to factory prewound the unexposed filmstrip from the film cartridge onto the film take-up spool. Moreover, in U.S. Pat. No. 5,530,507, the metering sprocket is engaged with the intermediate leader section in a way that should prevent the intermediate leader section from separating from the metering sprocket before the rear cover part is connected to the main body part. Specifically, the patent suggests that one of a several metering perforations in the intermediate leader section be made smaller than the remaining metering perforations in the filmstrip in order to be securely engaged with one of series of peripheral teeth of the metering sprocket.

SUMMARY OF THE INVENTION

According to one aspect of the invention, a one-time-use camera comprising a main body part having a spaced pair of cartridge receiving and film roll chambers and a film exposing chamber located between the cartridge receiving and film roll chambers, a separate-part light baffle inserted into the film exposing chamber, a metering sprocket rotatably supported on the main body part for engaging an intermediate film section which bridges a film cartridge loaded into the cartridge receiving chamber and at least a partial film convolution placed in the film roll chamber, and a rear cover part fitted to the main body part to make the main body part light-tight, is characterized in that:

the light baffle has a film holder for preventing the intermediate film section which bridges the film cartridge loaded into the cartridge receiving chamber and at least the partial film convolution placed in the film roll chamber from separating from the metering sprocket before the rear cover part is fitted to the main body part.

According to another aspect of the invention, a method of camera assembly comprising the steps of inserting a light baffle part into a film exposing chamber of a main body part, loading a film cartridge into a cartridge receiving chamber of the main body part and placing at least a partial film convolution in a film roll chamber of the main body part, engaging a metering sprocket which is rotatably supported on the main body part with an intermediate film section which bridges the film cartridge and at least the partial film convolution, and fitting a rear cover part to the main body part to make the main body part light-tight, is characterized in that:

the intermediate film section which bridges the film cartridge and at least the partial film convolution is positioned within the confines of a film holder of the light baffle before the rear cover part is fitted to the main body part, to prevent the intermediate film section from separating from the metering sprocket before the rear cover part is fitted to the main body part.

According to another aspect of the invention, a light baffle which is intended for use with a one-time-use camera that comprises a main body part having a spaced pair of cartridge receiving and film roll chambers and a film exposing chamber located between the cartridge receiving and film roll chambers, a metering sprocket rotatably supported on the main body part for engaging an intermediate film section which bridges a film cartridge loaded into the cartridge receiving chamber and at least a partial film convolution placed in the film roll chamber, and a rear cover part fitted to the main body part to make the main body part light-tight, and which is adapted to be inserted into the film exposing chamber, is characterized in that:

the light baffle has a film holder for preventing the intermediate film section which bridges the film cartridge loaded into the cartridge receiving chamber and at least the partial film convolution placed in the film roll chamber from separating from the metering sprocket, when the light baffle is inserted into the film exposing chamber, before the rear cover part is fitted to the main body part.

DETAILED DESCRIPTION OF THE INVENTION

The invention is disclosed as being embodied preferably in a one-time-use camera such as shown in incorporated U.S. Pat. No. 5,530,507. Because the features of a one-time-use camera have become generally known, the description which follows is directed in particular only to those elements forming part of or cooperating directly with the disclosed embodiment. It is to be understood, however, that other elements may take various forms known to a person of ordinary skill in the art.

THE APPARATUS

Figure 1:
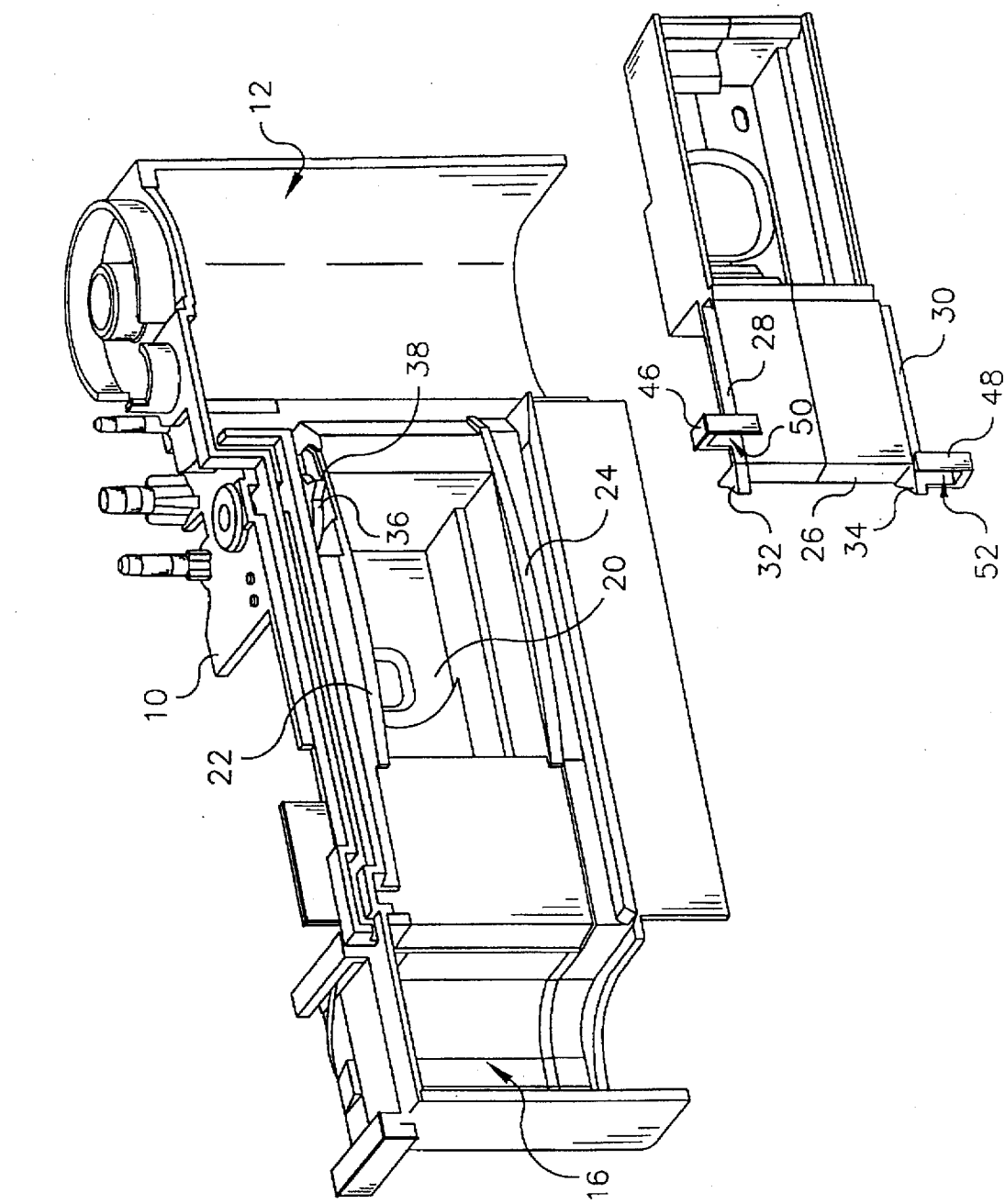
FIG. 1 is an assembled perspective view of the main body part and the light baffle, pursuant to a preferred embodiment of the invention.
Figure 2:
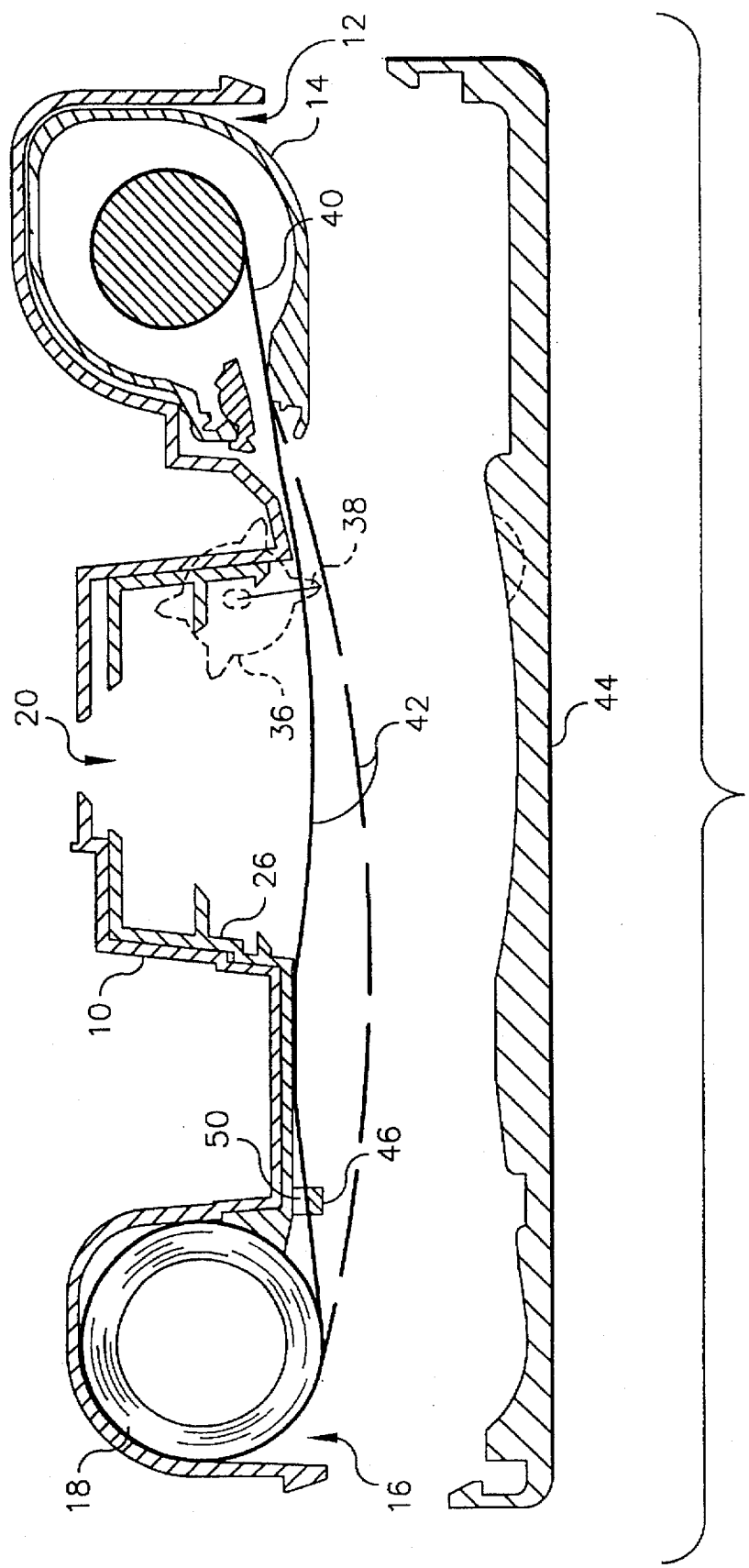
FIG. 2 is a sectional view of the main body part, the light baffle, and a rear cover part.

Referring now to the drawings, FIGS. 1 and 2 show certain parts of a one-time-use camera comprising a main body part 10 having a cartridge receiving chamber 12 for a film cartridge 14, a film roll chamber 16 for an unexposed film roll 18 which is pre-wound from the film cartridge, and a film exposing chamber 20 located between the two other chambers. A pair of parallel film rails 22 and 24 integrally formed with the main body part 10 are located longitudinally alongside the film exposing chamber 20. A separate-part light baffle 26 is intended to be inserted into the film exposing chamber 20 between the film rails 22 and 24.

The light baffle 26 has an integral pair of parallel film rails 28 and 30 that are aligned with the respective film rails 22 and 24 of the main body part 10, to serve as a longitudinal extension of the respective film rails of the main body part from the film exposing chamber 20 to the film roll chamber 16, when the light baffle is inserted into the film exposing chamber. See FIG. 1.

As shown in FIGS. 1 and 2, the light baffle 26 has an integral pair of parallel anti-clockspringing film retainers 32 and 34 that project from the respective film rails 28 and 30 of the light baffle to partially over the film roll chamber 16 to retain the unexposed film roll 18 in that chamber when the light baffle is inserted into the film exposing chamber 20.

A known metering sprocket 36 is rotatably supported on the main body part 10 in alignment substantially with the film rail 22 of the main body part, as shown in FIG. 1. The metering sprocket 36 has a series of four teeth 38 for entering successive known metering perforations, not show, in the filmstrip 40 to engage corresponding sections of the filmstrip. A prior art problem that can occur when the film cartridge 14 is loaded into the cartridge receiving chamber 12 and the unexposed film roll 18 is placed in the film roll chamber 16, and an intermediate film section 42 which bridges the film cartridge and the unexposed film roll is engaged with the metering sprocket 36, is illustrated in FIG. 2. Specifically, the intermediate film section 42 can separate (spring away) from the metering sprocket 36 before a rear cover part 44 is fitted to the main body part 10 to make the main body part light-tight. This is illustrated by the broken line depiction of the intermediate film section 42 in FIG. 2.

To solve this problem, the light baffle 26 has an integral pair of film holders 46 and 48 that project from the respective film rails 28 and 30 of the light baffle to prevent the intermediate film section 42 from separating from the metering sprocket 36 before the rear cover part 44 is fitted to the main body part 10. As shown in FIG. 1, the film holders 46 and 48 extend crosswise over the respective film rails 28 and 30 and leave film clearance spaces 50 and 52 between the film holders and the respective film rails to permit film movement through the film clearance spaces and to prevent the filmstrip 40 from separating from the respective film rails. The film holder 46 is substantially aligned with the metering sprocket 36 to prevent the intermediate film section 42 from separating from the metering sprocket.

The Method

A method of camera assembly comprises the steps of inserting the light baffle part 26 into the film exposing chamber 20 of the main body part 10, loading the film cartridge 14 into the cartridge receiving chamber 12 of the main body part and placing the unexposed film roll 18 (or at least a partial film convolution) in the film roll chamber 16 of the main body part, engaging the metering sprocket 36 with the intermediate film section 42 which bridges the film cartridge and the unexposed film roll, positioning the intermediate film section within the film clearance spaces 50 and 52 between the film holders 46 and 48 and the respective film rails 28 and 30 of the light baffle, and fitting the rear cover part 44 to the main body part to make the main body part light-tight.

Either one of the "engaging" and "positioning" steps can precede the other. Moreover, the "loading" and "placing" steps can be simultaneous or successive and one or both of them can precede or follow the "engaging" and/or "positioning" steps.

The invention has been described with reference to a preferred embodiment however, it will be appreciated that variations and modifications can be effected by a person of ordinary skill in the art without departing from the scope of the invention.

PARTS LIST 10. main body part
12. cartridge receiving chamber
14. film cartridge
16. film roll chamber
18. unexposed film roll
20. film exposing chamber
22. film rail
24. film rail
26. light baffle
28. film rail
30. film rail
32. film retainer
34. film retainer
36. metering sprocket
38. sprocket teeth
40. filmstrip
42. intermediate film section
44. rear cover part
46. film holder
48. film holder
50. film clearance space
52. film clearance space

What is claimed is:

1. A one-time-use camera comprising a main body part having a spaced pair of cartridge receiving and film roll chambers and a film exposing chamber located between said cartridge receiving and film roll chambers, a separate-part light baffle inserted into said film exposing chamber, a metering sprocket rotatably supported on said main body part for engaging an intermediate film section which bridges a film cartridge loaded into said cartridge receiving chamber and at least a partial film convolution placed in said film roll chamber, and a rear cover part fitted to said main body part to make the main body part light-tight, is characterized in that:

said light baffle has a film holder for preventing the intermediate film section which bridges the film cartridge loaded into said cartridge receiving chamber and at least the partial film convolution placed in said film roll chamber from separating from said metering sprocket before said rear cover part is fitted to said main body part.

2. A one-time-use camera as recited in claim 1, wherein said light baffle has a pair of film rails for supporting the intermediate film section, and said film holder projects from one of said film rails to prevent the intermediate film section from completely separating from said one film rail.

3. A one-time-use camera as recited in claim 2, wherein said metering sprocket and said one film rail from which said film holder projects are mutually aligned.

4. A one-time-use camera as recited in claim 2, wherein said film holder extends crosswise over said one film rail and leaves a film clearance space between the film holder and the one film rail to permit film movement through said film clearance space.

5. A one-time-use camera as recited in claim 1, wherein said metering sprocket and said film holder are mutually aligned.

6. A method of camera assembly comprising the steps of inserting a light baffle part into a film exposing chamber of a main body part, loading a film cartridge into a cartridge receiving chamber of the main body part and placing at least a partial film convolution in a film roll chamber of the main body part, engaging a metering sprocket which is rotatably supported on the main body part with an intermediate film section which bridges the film cartridge and at least the partial film convolution, and fitting a rear cover part to the main body part to make the main body part light-tight, is characterized in that:

the intermediate film section which bridges the film cartridge and at least the partial film convolution is positioned within the confines of a film holder of the light baffle before the rear cover part is fitted to the main body part, to prevent the intermediate film section from separating from the metering sprocket before the rear cover part is fitted to the main body part.

7. A method of camera assembly as recited in claim 6, wherein the intermediate film section which bridges the film cartridge and at least the partial film convolution is positioned within the confines of the film holder before the metering sprocket is engaged with the intermediate film section.

8. A method of camera assembly as recited in claim 6, wherein the intermediate film section which bridges the film cartridge and at least the partial film convolution is positioned within the confines of the film holder after the metering sprocket is engaged with the intermediate film section.

9. A method of camera assembly as recited in claim 6, wherein the intermediate film section which bridges the film cartridge and at least the partial film convolution is positioned within the confines of the film holder before the film cartridge is loaded into the cartridge receiving chamber.

10. A method of camera assembly as recited in claim 6, wherein the intermediate film section which bridges the film cartridge and at least the partial film convolution is positioned within the confines of the film holder after the film cartridge is loaded into the cartridge receiving chamber.

11. A method of camera assembly as recited in claim 6, wherein the intermediate film section which bridges the film cartridge and at least the partial film convolution is positioned within the confines of the integral film holder before at least the partial film convolution is placed in the film roll chamber.

12. A method of camera assembly as recited in claim 6, wherein the intermediate film section which bridges the film cartridge and at least the partial film convolution is positioned within the confines of the film holder after at least the partial film convolution is placed in the film roll chamber.

13. A light baffle which is intended for use with a one-time-use camera that comprises a main body part having a spaced pair of cartridge receiving and film roll chambers and a film exposing chamber located between the cartridge receiving and film roll chambers, a metering sprocket rotatably supported on the main body part for engaging an intermediate film section which bridges a film cartridge loaded into the cartridge receiving chamber and at least a partial film convolution placed in the film roll chamber, and a rear cover part fitted to the main body part to make the main body part light-tight, and which is adapted to be inserted into the film exposing chamber, is characterized in that:

said light baffle has a film holder for preventing the intermediate film section which bridges the film cartridge loaded into the cartridge receiving chamber and at least the partial film convolution placed in the film roll chamber from separating from the metering sprocket, when the light baffle is inserted into the film exposing chamber, before the rear cover part is fitted to the main body part.

14. A light baffle as recited in claim 13, wherein said light baffle has a pair of film rails for supporting the intermediate film section, and said film holder projects from one of said film rails to prevent the intermediate film section from completely separating from said one film rail.

15. A light baffle as recited in claim 14, wherein said film holder extends crosswise over said one film rail and leaves a film clearance space between the film holder and the one film rail to permit film movement through said film clearance space.

* * * * *